United States Patent
Milanesi et al.

(10) Patent No.: US 11,828,337 B2
(45) Date of Patent: Nov. 28, 2023

(54) CALIPER BODY AND BRAKE CALIPER WITH SAID BODY

(71) Applicant: BREMBO S.p.A., Curno (IT)

(72) Inventors: Andrea Milanesi, Curno (IT); Pietro Barale, Curno (IT)

(73) Assignee: Brembo S.p.A., Bergamo (IT)

( * ) Notice: Subject to any disclaimer, the term of this patent is extended or adjusted under 35 U.S.C. 154(b) by 147 days.

(21) Appl. No.: 17/602,847

(22) PCT Filed: Mar. 25, 2020

(86) PCT No.: PCT/IB2020/052810
§ 371 (c)(1),
(2) Date: Oct. 11, 2021

(87) PCT Pub. No.: WO2020/208453
PCT Pub. Date: Oct. 15, 2020

(65) Prior Publication Data
US 2022/0145951 A1 May 12, 2022

(30) Foreign Application Priority Data
Apr. 12, 2019 (IT) .......................... 102019000005672

(51) Int. Cl.
*F16D 55/228* (2006.01)
*F16D 55/00* (2006.01)

(52) U.S. Cl.
CPC ...... *F16D 55/228* (2013.01); *F16D 2055/002* (2013.01)

(58) Field of Classification Search
CPC .......................... F16D 55/228; F16D 2055/002
(Continued)

(56) References Cited

U.S. PATENT DOCUMENTS

| 4,705,093 A | 11/1987 | Ogino |
| 6,260,670 B1 | 7/2001 | Maehara |
| (Continued) | | |

FOREIGN PATENT DOCUMENTS

| DE | 19647999 A1 | 5/1998 |
| DE | 102008038035 A1 | 2/2010 |
| (Continued) | | |

OTHER PUBLICATIONS

European Patent Office, International Search Report with Written Opinion, issued in PCT/IB2020/052810, dated Apr. 22, 2020, 12 pages, European Patent Office, Rijswijk, Netherlands.

*Primary Examiner* — Christopher P Schwartz
(74) *Attorney, Agent, or Firm* — Marshall & Melhorn, LLC

(57) ABSTRACT

A caliper body of a brake caliper has supports for supporting thrust devices, brake pads or at least one attaching element, and feeding pipes for supplying the thrust devices, the supports and feeding pipes being made of a first material capable of withstanding high pressures, and at least one inner body portion made of a second material adapted to incorporate the supports and feeding pipes and obtain shapes having complex geometry for distributing stress received from the supports and feeding pipes. The at least one inner body portion forms a first vehicle side elongated element facing a first braking surface, and a second wheel side elongated element facing a second braking surface opposite to the first braking surface. The caliper body has at least one outer body portion made of a third material adapted to form a reinforcement with mechanical resistance.

20 Claims, 7 Drawing Sheets

(58) Field of Classification Search
USPC ......... 188/72.4, 73.43, 73.47; 164/76.1, 132, 164/137, 369; 29/527.6
See application file for complete search history.

(56) References Cited

U.S. PATENT DOCUMENTS

| | | |
|---|---|---|
| 8,336,681 B2 | 12/2012 | Renz et al. |
| 9,475,468 B2 | 10/2016 | Valle et al. |
| 9,873,149 B2 * | 1/2018 | Arai ........................ B22C 9/101 |
| 10,077,817 B2 * | 9/2018 | Kawamata ............. B22C 9/108 |
| 10,502,275 B2 | 12/2019 | Piccoli et al. |
| 10,888,918 B2 * | 1/2021 | Koduri ................... F16D 65/18 |
| 11,415,188 B2 * | 8/2022 | Barale ................... F16D 65/183 |
| 2002/0086165 A1 | 7/2002 | Davis et al. |
| 2010/0170755 A1 * | 7/2010 | Biggs ................... F16D 55/228 188/72.4 |

FOREIGN PATENT DOCUMENTS

| | | | |
|---|---|---|---|
| DE | 102016202543 A1 | 8/2017 | |
| EP | 0725697 B1 | 9/1997 | |
| GB | 2087490 A | 5/1982 | |
| GB | 2127117 A * | 4/1984 | ........... F16D 55/226 |
| GB | 2176725 B | 7/1989 | |
| WO | WO2012/153355 A1 | 11/2012 | |
| WO | WO2017/021817 A1 | 2/2017 | |

\* cited by examiner (state of the art)

CALIPER BODY AND BRAKE CALIPER WITH SAID BODY

CROSS-REFERENCE TO RELATED APPLICATIONS

This application is a National Phase Application of PCT International Application No. PCT/IB2020/052810, having an International Filing Date of Mar. 25, 2020 which claims priority to Italian Application No. 102019000005672 filed Apr. 12, 2019, each of which is hereby incorporated by reference in its entirety.

FIELD OF THE INVENTION

The present invention relates to a caliper body of disc brake, to a brake caliper, and to a disc brake, as well as to a method for manufacturing said caliper body.

The disc brake assembly is described below referring to the rotation axis of the disc, indicated with reference X-X, which defines an axial direction. Axial direction means any direction A-A directed parallel to the rotation axis of the brake disc. Radial direction further means all directions orthogonal to the rotation axis X-X and incident therewith. Further again, circumferential direction means that circumference orthogonal to the axial direction and to the radial directions.

Differently, tangent direction T-T means a direction which duly is orthogonal to an axial direction A-A and a radial direction R-R.

BACKGROUND ART

The brake caliper in vehicles, in particular in the disc brakes, is arranged straddling the outer peripheral edge of a brake disc. The brake caliper usually comprises a body having two elongated elements referred to as side portions, which are arranged so as to face opposite braking surfaces of a disc. Friction pads are provided between each side portion of the caliper and the braking surfaces of the brake disc. At least one of the side portions of the caliper body has cylinders adapted to accommodate pistons, which are actuated in any known manner of suitable type (for example hydraulic or electric pistons), which are capable of exerting a thrust action on the pads, abutting them against the braking surfaces of the disc to apply a braking action on the vehicle.

The brake calipers usually are restrained to a support structure which remains fixed to the vehicle, such as, for example a stub axle of a suspension of a vehicle.

In a typical arrangement, one of the two side portions has two or more portions for attaching the caliper body to the support structure, for example by providing loops or eyelets, for example arranged axially, or through holes, for example arranged radially, adapted to receive screws for fastening the caliper which, with the ends thereof, are accommodated in threaded holes provided on the support of the caliper.

Such a side portion is referred to as a side attaching portion or vehicle side elongated element.

The other portion is referred to as a side non-attaching portion or wheel side elongated element.

In a typical construction of a caliper body, the side portions facing the braking surfaces of the disc are connected to one another by bridge elements arranged straddling the disc referred to as bridges.

A caliper body generally is mainly made of aluminum, more rarely of steel.

Such a material is satisfactory in terms of resistance to the stresses and rigidity, however the aluminum or steel caliper bodies have an increased weight.

As is well known, a caliper body having increased weight is a significant drawback for various reasons, among which the performance of the vehicle on which it is applied and the efficiency of the braking and the increased stresses which an increased non-suspended mass generates on the suspensions of the vehicle.

Various solutions have been studied in order to obtain a caliper body which in addition to having sufficient rigidity and resistance to the stresses, also has a reduced weight.

For example, patent application published under No. GB 2 087 490 discloses a disc brake caliper made of aluminum, which comprises a steel or titanium insert.

Patent application published under No. DE 196 47 999 discloses an aluminum caliper provided with a reinforcement made of composite material having a metallic matrix.

European patent No. EP 0 725 697 discloses a method for manufacturing a caliper which includes molding a bridge and an outer portion of an arm, and wherein an insert made of iron alloy is used.

American patent application published under No. US 2010/0038190 discloses a caliper obtained by molding with a lightweight metal or an alloy thereof, which comprises a structure made of iron or an alloy thereof.

Other known solutions provide reinforcement elements embedded in the caliper body or associated therewith, for example externally, which are also made of composite materials. These solutions are disclosed, for example in US 2002/086165, US 2010/038190, DE19647999, GB2087490 and GB2176725.

Although they achieve the desired mechanical resistance and rigidity, the above-mentioned known solutions do not achieve satisfactory advantages in terms of the reduction of the weight.

Solutions are also known where entire portions of the caliper body are made of synthetic material, such as, for example publication WO2012153355; however this known solution does not allow a component to be obtained which simultaneously both is sufficiently strong and adaptable to the also complex shapes of the actuation or attaching or stress draining components of the caliper, and is rigid and resistant (also with high elastic modulus) to allow a reduced deformation of the caliper body also when stressed by high pressures or tightening forces when the calipers are electromechanically actuated, for example by the brake fluid and therefore of the braking action.

Therefore, the need is still strongly felt to provide a caliper body for disc brake which achieves a sufficient reduction of the weight, in addition to increased mechanical resistance and structural rigidity.

Solution

These and other objects are achieved by a caliper body, a brake caliper, and a method for manufacturing a caliper body as described and claimed herein.

Certain advantageous embodiments are the subject of the dependent claims.

It has emerged from the analysis of this solution how the proposed solution allows the weight to be reduced of the caliper, one of the main non-suspended masses of the vehicle.

A reduction of the weights results in a subsequent reduction of the emissions of the vehicle.

An increase in rigidity and a subsequent reduction of the absorption of the brake fluid are advantageously achieved, more generally deformations of the caliper body upon the actuation (to also consider the case of calipers without fluid), due to the employment of materials with a high elastic modulus.

Further, an increased comfort is achieved due to the employment of intrinsically damping materials.

The "multilayer" solution (with a part of inner body and a part of outer body associated or co-molded therebetween) allows an inner "bearing" part to be obtained, which allows a resistance to effort and reduced damage and increased safety, creating a front for stopping cracks or defects and keeping the functionality of the component for a longer period of time.

The solutions proposed simultaneously allow both being sufficiently strong and adaptable to the also complex shapes of the actuation or attaching or stress draining components of the caliper (with the inner caliper portion), and being rigid and resistant (also with high elastic modulus—with the outer caliper portion) to allow a reduced overall deformation of the caliper body also when stressed by high pressures, for example of the brake fluid and therefore of the braking action.

DRAWINGS

Further features and advantages of the invention will become apparent from the following description of preferred and non-limiting embodiments thereof, with reference to the accompanying drawings, in which.

DESCRIPTION OF SOME PREFERRED EMBODIMENTS

Figure 1:
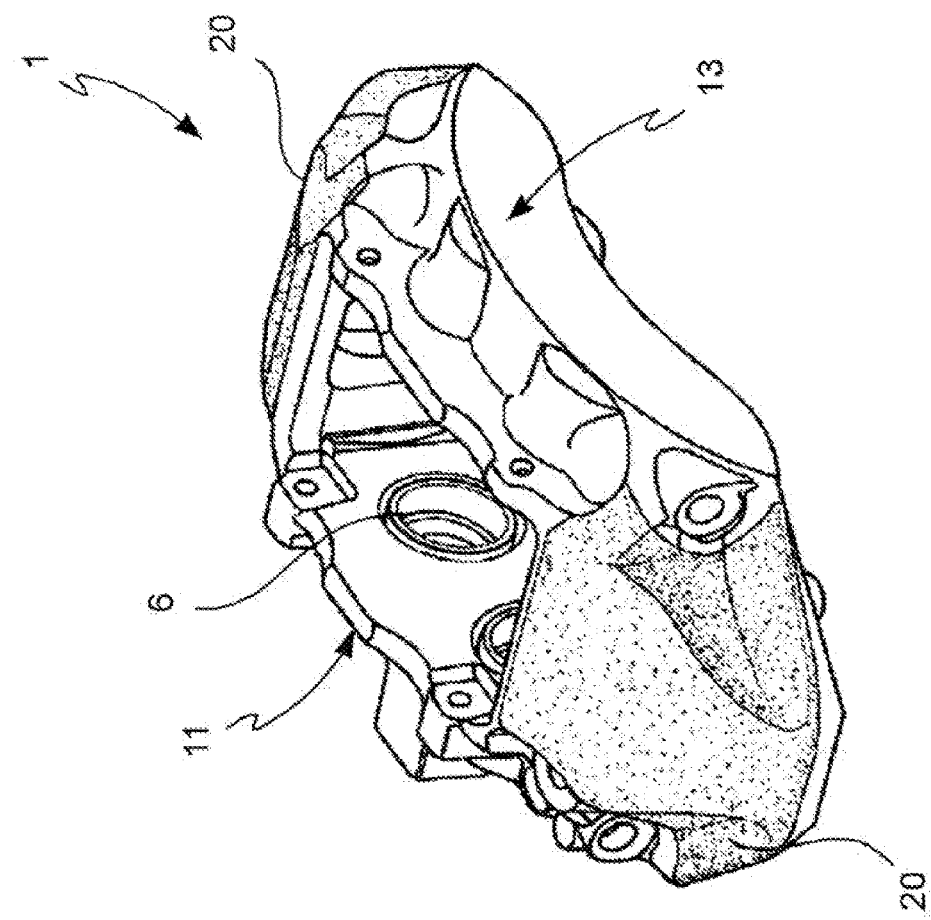
FIG. 1 shows an axonometric view of a solution of the background art, according to the teaching of WO2012153355.
Figure 2:
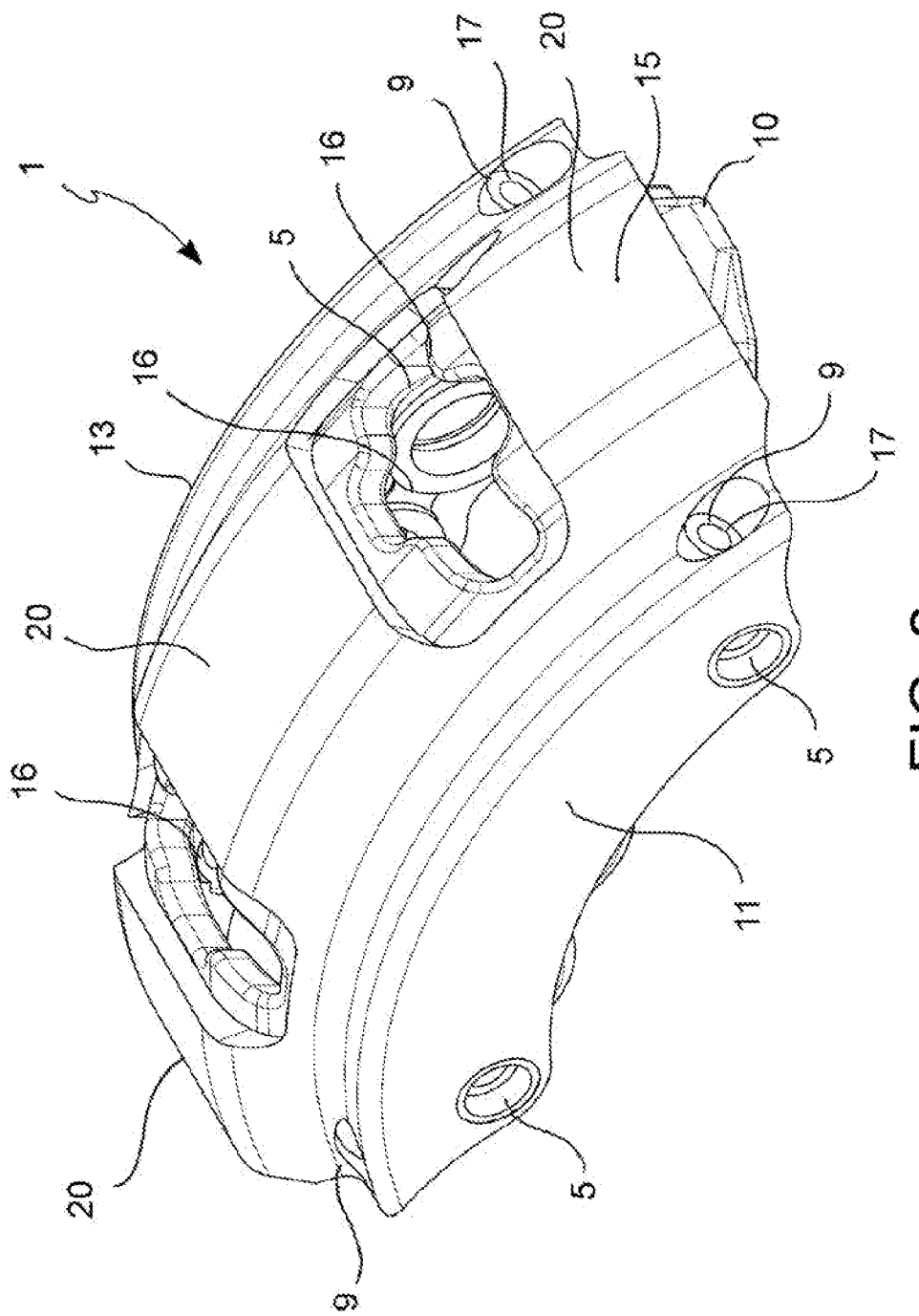
FIG. 2 shows an axonometric view of a caliper body in accordance with the invention.
Figure 4:
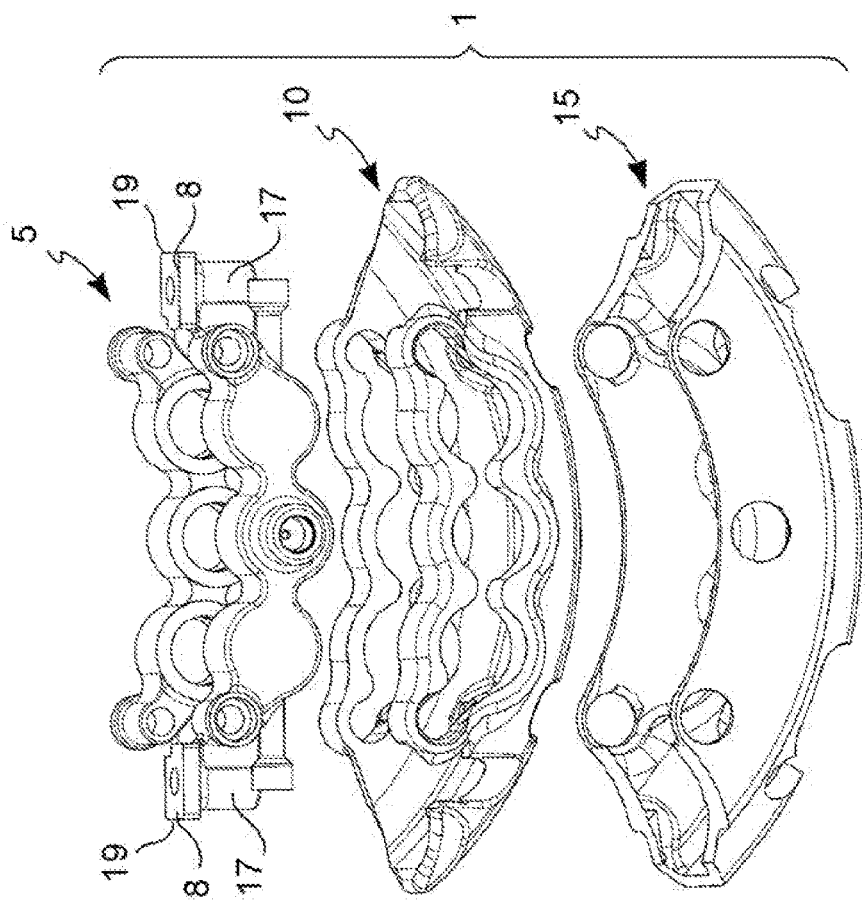
FIGS. 3 and 4 show an axonometric view, with separated parts, of the caliper body in FIG. 2, in radial view from the outside inward and in radial view from the inside outward.
Figure 3:
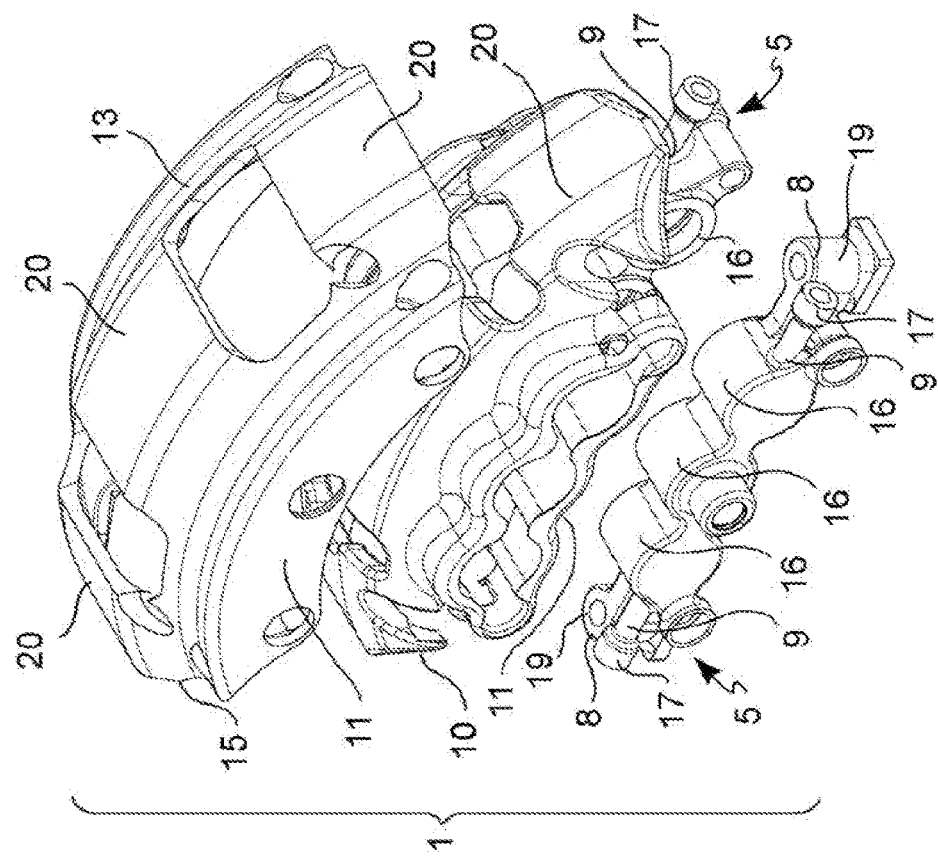
Figure 5:
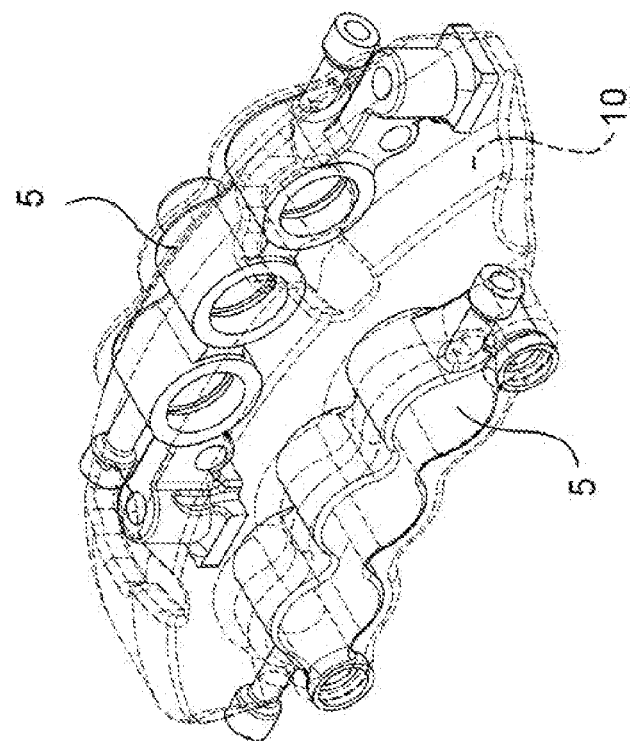
FIG. 5 shows two steps of injecting the polymer over cores formed by the cylinders and fluid feeding pipes, the pad abutment elements and the elements for attaching the caliper to the stub axle.
Figure 5:
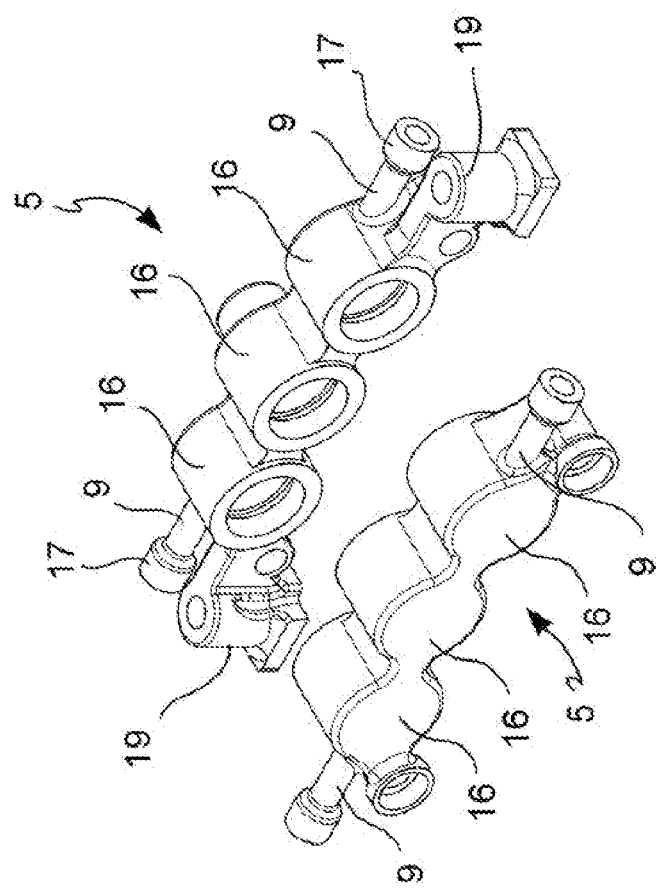
Figure 6:
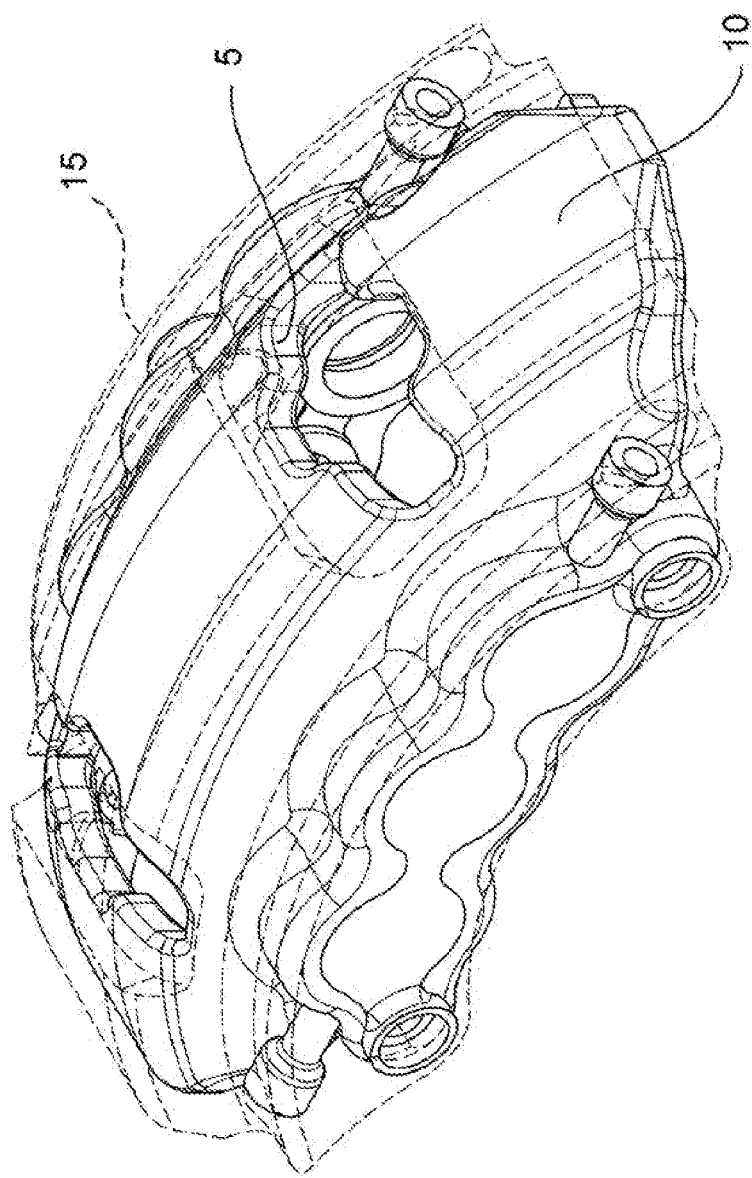
FIG. 6 shows a step of co-molding the outer caliper portion which encircles an inner caliper portion.
Figure 8:
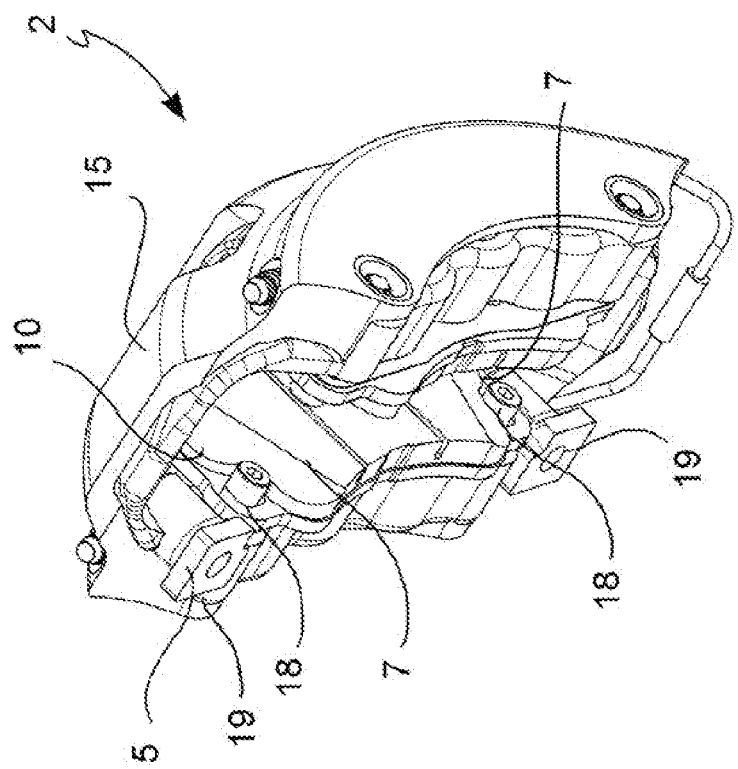
FIGS. 7 and 8 show two axonometric views, from opposite sides, of a brake caliper comprising a caliper body as in FIG. 2.
Figure 7:
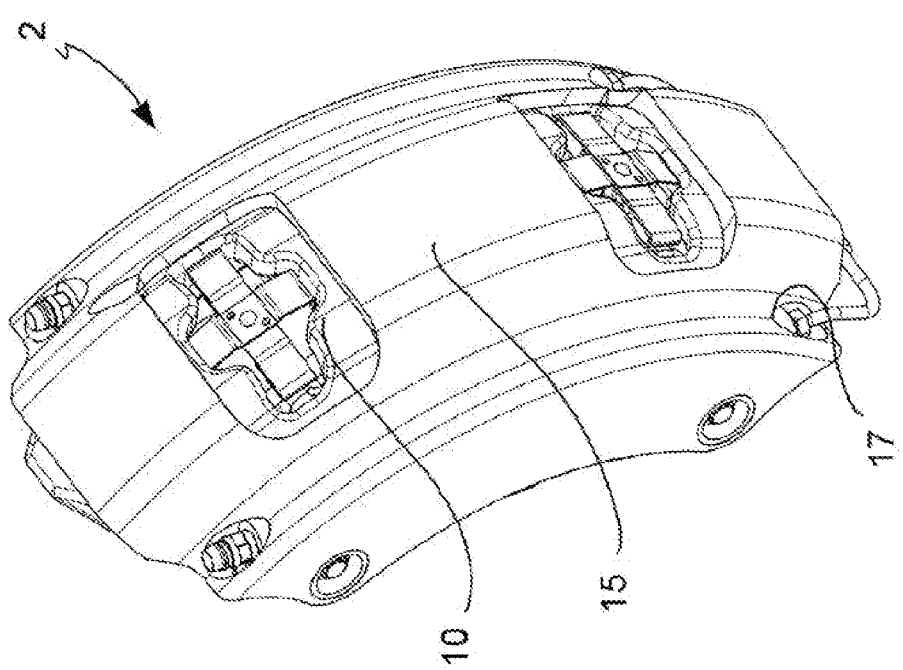
Figure 9:
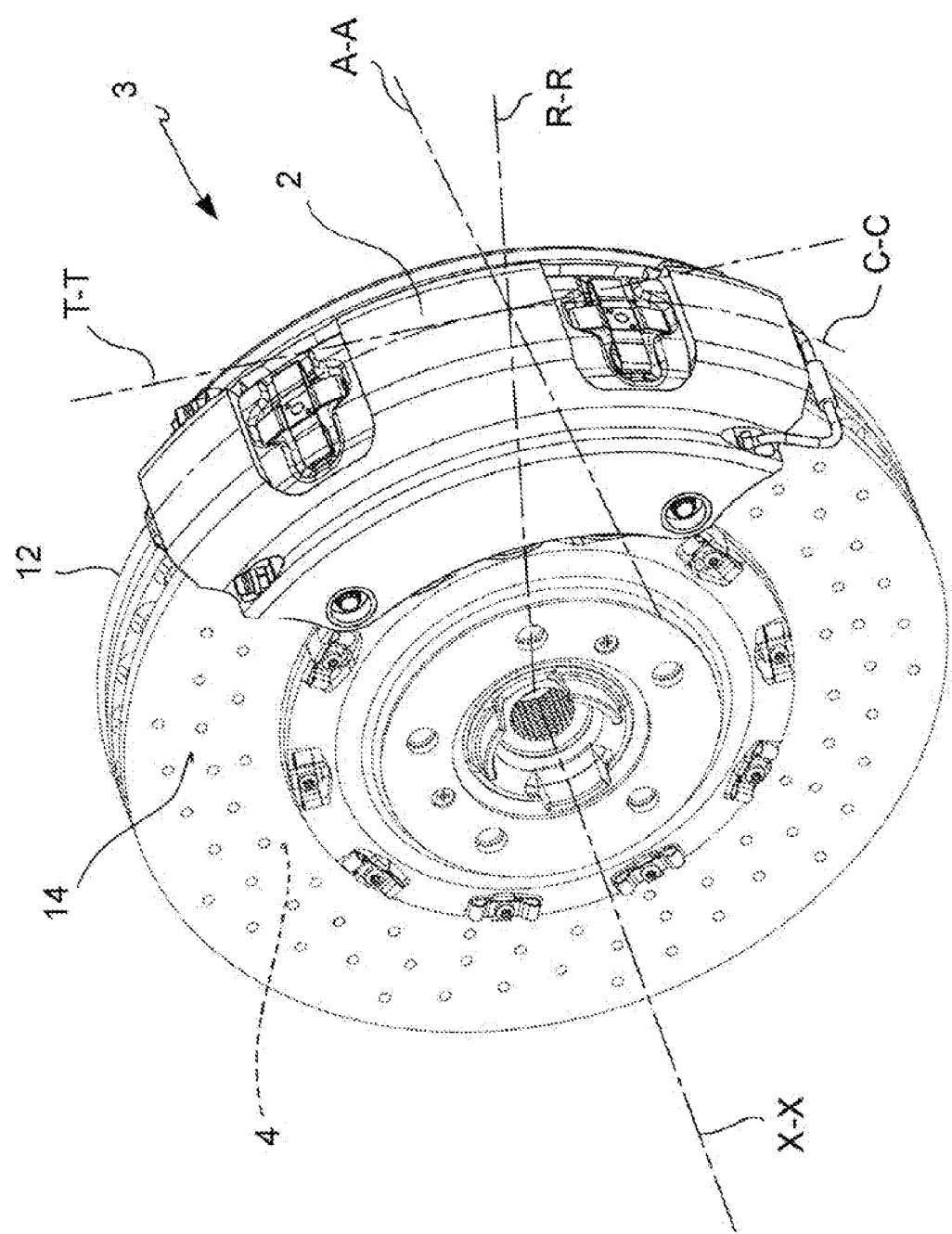
FIG. 9 shows an axonometric view of a brake disc comprising a brake caliper as shown in FIG. 7 or 8.

In accordance with a general embodiment, a caliper body 1 of a brake caliper 2 of disc brake 3 is adapted to be arranged straddling a brake disc 4 in order to apply a braking action on a vehicle.

Said caliper body 1 comprises supporting elements, or more briefly indicated as supports 5, for supporting, for example thrust or actuation devices 6 and/or supporting brake pads 7 and/or supporting at least one attaching element of the caliper body 8 for attaching the caliper body 1 to a support of the caliper, as well as feeding pipes 9 for the fluid or electric supply to the thrust devices 6.

Said supports 5 and feeding pipes 9, for example cylinders 16 for accommodating pistons, are made of a first material adapted to withstand high pressures.

Said caliper body 1 comprises at least one inner body portion 10 made of a second material adapted to at least partially incorporate therein said supports 5 and feeding pipes 9 and to obtain shapes having complex geometry capable of distributing the stress received from the supports 5 and feeding pipes 9.

Said at least one inner body portion 10 forms a first vehicle side elongated element 11 adapted to face a first braking surface 12 of the brake disc 4, and a second wheel side elongated element 13 adapted to face a second braking surface 14 of the brake disc 4 opposite to said first braking surface 12.

In accordance with an embodiment, said at least one inner body portion 10 forms at least one bridge element 20 adapted to be arranged straddling said brake disc 4 and connect said first vehicle side elongated element 11 with said second wheel side elongated element 13.

Advantageously, said caliper body 1 further comprises at least one outer body portion 15 made of a third material adapted to form a reinforcement with mechanical resistance.

Further advantageously, said supports 5 and feeding pipes 9 are embedded at least partially in said at least one inner body portion 10.

Said inner body portion 10 is surrounded and encircled by said at least one outer body portion 15.

In accordance with an embodiment, said at least one outer body portion 15 is a single outer body portion made in one piece.

In accordance with an embodiment, said at least one outer body portion 15 applied over said at least one inner body portion 10.

In accordance with an embodiment, said at least one outer body portion 15 is co-molded over said at least one inner body portion 10.

In accordance with an embodiment, said at least one outer body portion 15 substantially entirely covers said at least one inner body portion 10.

In accordance with an embodiment, said at least one outer body portion 15 is made of a polymeric matrix with embedded reinforcing fibers.

In accordance with an embodiment, said reinforcing fibers are long reinforcing fibers arranged in controlled manner along the geometry of said at least one outer body portion 15 to obtain said at least one outer body portion 15 with anisotropic mechanical properties; and/or to obtain said at least one outer body portion 15 with greater mechanical properties in the direction of the fibers, in the direction of the main stresses during use.

In accordance with an embodiment, said length of the long fibers is sufficient to cover at least ⅓ or ⅔ or the entire extension in axial direction of said at least one outer body portion 15.

In accordance with an embodiment, said length of the long fibers is sufficient to cover at least ⅓ or ⅔ or the entire extension in circumferential direction of said at least one outer body portion 15.

In accordance with an embodiment, said at least one outer body portion 15 is made of a thermoplastic or thermosetting material matrix with temperature resistance of at least 200° C., e.g. at least 230° C., in which reinforcing fibers are embedded.

In accordance with an embodiment, said thermoplastic or thermosetting material comprises one or more selected materials, preferably: PEEK polyether ether ketone, PEI polyethyleneimine, PES polyether sulfone, PPS polyphenylene sulfide, PA46 polyamide 46, PPA polyphthalamide.

In accordance with an embodiment, said carbon fibers of the reinforced thermoplastic or thermosetting material comprise one or more materials selected between: HT fibers (high tenacity fibers), IM fibers (intermediate module fibers) and HM fibers (high modulus fibers).

In accordance with an embodiment, said at least one inner body portion 10 is a single inner body portion made in one piece.

In accordance with an embodiment, said at least one inner body portion 10 is co-molded over said supports 5 and feeding pipes 9.

In accordance with an embodiment, said supports 5 and feeding pipes 9 are used as cores in the molding of the portion of said at least one inner body portion 10.

In accordance with an embodiment, said one inner body portion 10 is made of a polymeric matrix with embedded reinforcing fibers.

In accordance with an embodiment, said reinforcing fibers are short reinforcing fibers arranged randomly oriented in said matrix to obtain said at least one inner body portion 10 with substantially isotropic mechanical properties.

In accordance with an embodiment, said at least one inner body portion 10 is made of a material adapted to injection molding or low-pressure resin injection molding or RTM.

In accordance with an embodiment, said at least one inner body portion 10 is made of a material adapted to receive stresses from said supports 5 and feeding pipes 9 and to transmit said stresses by distributing them on large surfaces to said at least one outer body portion 15.

In accordance with an embodiment, said supports 5 comprise at least one cylinder 16 for housing thrust devices 6 of the brake pads 7 against the braking surfaces 12, 14 of a brake disc 4.

In accordance with an embodiment, said supports 5 comprise walls of a chamber for housing an electromechanical thrust device.

In accordance with an embodiment, said feeding pipes 9 comprise pipes for feeding brake fluid.

In accordance with an embodiment, said feeding pipes 9 are pipes for accommodating connection and power wires of electromechanical devices.

In accordance with an embodiment, said supports 5 are entirely embedded in said at least one inner body portion 10.

In accordance with an embodiment, the supports 5 are embedded in the at least one inner body portion 10 leaving at least one surface of at least one wall of the supports 5 in sight, e.g. flush with the outer surface of the at least one inner body portion 10.

In accordance with an embodiment, said feeding pipes 9 are entirely embedded in said at least one inner body portion 10.

In accordance with an embodiment, said feeding pipes 9 are embedded in said at least one inner body portion 10 leaving pipe connecting portions 17 for connecting to additional feeding pipes accessible for connecting the caliper body 1 to further feeding pipes outside the brake caliper 2.

In accordance with an embodiment, said supports 5 and/or feeding pipes 9 are made of material adapted to provide a hydraulic seal.

In accordance with an embodiment, said supports 5 and/or feeding pipes 9, for example said cylinders 16, are made of metallic material.

In accordance with an embodiment, said metallic material is aluminum or aluminum alloy or magnesium or magnesium alloy or aluminum AlSi7 or steel.

In accordance with an embodiment, said supports 5 and/or feeding pipes 9 and/or piston housings are made of composite material adapted to achieve axial-symmetrical structures resistant to high hydraulic pressures or high efforts, including the case of electrically-operated calipers.

In accordance with an embodiment, said supports 5 and/or feeding pipes 9 and cylinders 16 are made of composite material with long embedded fibers where at least some of these fibers are extended to at least ⅓ or ½ or the entire longitudinal extension of said supports 5 and/or feeding pipes 9.

In accordance with an embodiment, said supports 5 comprise pad supporting devices 18 comprising pad supporting surfaces adapted to remain outside said at least one inner body portion 10 and adapted to face brake pads 7 for receiving and supporting said brake pads 7.

In accordance with an embodiment, said supports 5 comprise attaching or connecting elements 19 for connecting the caliper body to a caliper support, e.g. a stub axle of a vehicle or a suspension of a vehicle or fork of motorcycle.

The present invention also relates to a brake caliper 2 comprising a caliper body 1 as defined in any one of the embodiments described above.

A method for manufacturing a caliper body 1 as described above, is described below.

A method for manufacturing a caliper body 1 comprises the steps of:
providing supports 5 and feeding pipes 9;
co-molding at least one inner body portion 10 over said supports 5 and feeding pipes 9;
applying or co-molding at least one outer body portion 15 to said caliper inner body portion 10.

According to further embodiments of a method, there are provided the further optional steps:
injection-molding said at least one inner body portion in a mold into which said supports 5 and feeding pipes 9 are inserted as cores.

According to further embodiments of a method, there are provided the further optional steps:
co-molding said at least one outer body portion 15 in a mold in which said at least one inner body portion 10 is inserted, containing supports 5 and feeding pipes 9, as core.

A further method for manufacturing a caliper body 1 comprises the steps of:
providing supports 5 and feeding pipes 9 and piston housings 16;
co-molding at least one inner body portion 10 over said supports 5 and feeding pipes 9 and piston housings 16;
applying or co-molding at least one outer body portion 15 to said caliper inner body portion 10.

In accordance with a further optional embodiment step, the outer caliper portion 15 is co-molded over the inner caliper portion already formed, as though the latter were a core.

Those skilled in the art may make several changes and adaptations to the above-described embodiments, and may replace elements with others which are functionally equivalent in order to meet contingent and specific needs, without departing from the scope of the following claims.

LIST OF REFERENCES

1 Caliper body
2 brake caliper
3 disc brake
4 brake disc 5 supports
6 thrust or actuation devices
7 brake pads
8 attaching element of the caliper body
9 feeding pipes
10 inner body portion
11 first vehicle side elongated element
12 first braking surface
13 second wheel side elongated element
14 second braking surface
15 outer body portion
16 cylinder
17 pipe connecting portions
18 pad supporting devices
19 attaching or connection elements
20 bridge element
X-X rotation axis of brake disc
A-A axial direction parallel to rotation axis
R-R radial direction orthogonal to rotation axis
C-C circumferential direction orthogonal to axial direction and radial directions
T-T tangential direction duly orthogonal to a radial direction and axial direction

The invention claimed is:

1. A caliper body of a brake caliper of disc brake configured to be arranged straddling a brake disc to apply a braking action on a vehicle, said caliper body comprising:
supporting elements or supports for supporting thrust or actuation devices, brake pads or at least one attaching element of the caliper body for attaching the caliper body to a support of the brake caliper, and feeding pipes and/or piston housings for supplying the thrust devices, wherein the supports and feeding pipes are made of a first material capable of withstanding high pressures;
at least one inner body portion made of a second material adapted to at least partially incorporate said supports and feeding pipes and obtain shapes having a geometry capable of distributing stress received from the supports and feeding pipes;
said at least one inner body portion forming a first vehicle side elongated element adapted to face a first braking surface of the brake disc and a second wheel side elongated element adapted to face a second braking surface of the brake disc opposite to said first braking surface;
said caliper body further comprising at least one outer body portion made of a third material adapted to form a reinforcement with mechanical resistance, wherein
said supports and feeding pipes are at least partially embedded in said at least one inner body portion, and
said at least one inner body portion is surrounded and encircled by said at least one outer body portion.

2. The caliper body of claim 1, wherein:
said at least one outer body portion is a single outer body portion made in one piece;
said at least one outer body portion is applied over said at least one inner body portion;
said at least one outer body portion is co-molded over said at least one inner body portion;
or wherein
said at least one outer body portion is applied over said at least one inner body portion;
said at least one outer body portion is co-molded over said at least one inner body portion;
said at least one outer body portion entirely covers said at least one inner body portion;
or wherein
said at least one outer body portion is applied over said at least one inner body portion;
said at least one outer body portion entirely covers said at least one inner body portion.

3. The caliper body of claim 1, wherein:
said at least one outer body portion is made of a polymeric matrix with embedded reinforcing fibers; and wherein
said reinforcing fibers are long reinforcing fibers arranged in controlled manner along a geometry of said at least one outer body portion to obtain said at least one outer body portion with anisotropic mechanical properties, and/or to obtain said at least one outer body portion with greater mechanical properties in a direction of the long reinforcing fibers; and alternatively wherein
a length of the long reinforcing fibers is sufficient to cover at least ⅓ or ⅔ or an entire extension in axial direction of said at least one outer body portion, and/or wherein
said length of the long fibers is sufficient to cover at least ⅓ or ⅔ or the entire extension in circumferential direction of said at least one outer body portion;
or wherein
said at least one outer body portion is made of a thermoplastic or thermosetting material matrix with temperature resistance of at least 200° C., in which the reinforcing fibers are embedded; and wherein
said thermoplastic or thermosetting material comprises one or more materials selected from the group consisting of: polyether ether ketone (PEEK), polyethylenimine (PEI), polyether sulfone (PES), polyphenylenesulphide (PPS), polyamide 46 (PA46), and polyphthalamide (PPA); and wherein
carbon fibers of reinforced thermoplastic or thermosetting material comprise one or more fibers selected from the group consisting of: high tenacity fibers (HT fibers), intermediate module fibers (IM fibers) and high modulus fibers (HM fibers).

4. The caliper body of claim 1, wherein:
said at least one inner body portion is a single inner body portion made in one piece; and wherein
said at least one inner body portion is co-molded over said supports and feeding pipes; and wherein
said supports and feeding pipes are used as cores in molding of said at least one inner body portion;
or wherein
said at least one inner body portion is made of polymeric matrix with embedded reinforcing fibers; and wherein
said reinforcing fibers are short reinforcing fibers arranged randomly oriented in said polymeric matrix to obtain said at least one inner body portion with isotropic mechanical properties;
or wherein
said at least one inner body portion is made of a material adapted for injection molding or low-pressure resin injection molding or resin transfer molding (RTM);
or wherein
said at least one inner body portion is made of a material adapted to receive stresses from said supports and feeding pipes and to transmit said stresses by distributing said stresses on large surfaces to said at least one outer body portion.

5. The caliper body of claim 1, wherein said supports comprise at least one cylinder for housing the thrust devices of the brake pads against braking surfaces of the brake disc.

6. The caliper body of claim 1, wherein said supports comprise walls of a chamber for housing an electromechanical thrust device.

7. The caliper body of claim 1, wherein said feeding pipes comprise pipes for feeding brake fluid.

8. The caliper body of claim 1, wherein said feeding pipes are pipes for accommodating connection and power wires of electromechanical devices.

9. The caliper body of claim 1, wherein said supports are entirely embedded in said at least one inner body portion.

10. The caliper body of claim 1, wherein said supports are embedded in said at least one inner body portion leaving at least one surface of at least one wall of said supports in sight.

11. The caliper body of claim 1, wherein said feeding pipes are entirely embedded in said at least one inner body portion.

12. The caliper body of claim 1, wherein said feeding pipes are embedded in said at least one inner body portion leaving pipe connecting portions for connecting to additional pipes accessible for connecting the caliper body to further pipes outside the brake caliper.

13. The caliper body of claim 1, wherein:
said supports and feeding pipes are made of a material adapted to provide a hydraulic seal;
or wherein
said supports and feeding pipes are made of metallic material; and wherein
said metallic material is aluminum, aluminum alloy, magnesium, magnesium alloy, aluminum AlSi7 or steel.

14. The caliper body of claim 1, wherein said supports, feeding pipes and/or piston housings are made of composite material adapted to achieve axial-symmetrical structures resistant to high hydraulic pressures.

15. The caliper body of claim 1, wherein said supports and feeding pipes are made of composite material with long embedded fibers where at least some of said long embedded fibers are extended to at least $\frac{1}{3}$ or $\frac{1}{2}$ or an entire longitudinal extension of said supports and/or feeding pipes.

16. The caliper body of claim 1, wherein:
said supports comprise pad supporting devices comprising pad supporting surfaces adapted to remain outside said at least one inner body portion and to face the brake pads for receiving and supporting said brake pads;
or wherein
said supports comprise attaching or connecting elements for connecting the caliper body to a caliper support.

17. A brake caliper comprising a caliper body as defined in claim 1.

18. A method for manufacturing a caliper body, said method comprising:
providing supports and feeding pipes;
molding at least one inner body portion over said supports and feeding pipes; and
applying or molding at least one outer body portion to said at least one inner body portion.

19. The method of claim 18, comprising at least one of the following optional steps:
injection-molding said at least one inner body portion in a mold into which said supports and feeding pipes are inserted as cores;
molding said at least one outer body portion in a mold in which said at least one inner body portion is inserted, containing supports and feeding pipes as cores.

20. The method of claim 18, comprising the following optional steps:
providing supports, feeding pipes and piston housings;
molding said at least one inner body portion over said supports, feeding pipes and piston housings; and
applying or molding said at least one outer body portion to said at least one inner body portion.

* * * * *